United States Patent [19]
Jensen et al.
[11] 4,133,359
[45] Jan. 9, 1979

[54] WOODSPLITTER

[75] Inventors: Bruce W. Jensen; David L. Bacon, both of Denver, Colo.
[73] Assignees: Lawrence E. Livingston; Victoria A. Livingstone, both of Englewood, Colo.

[21] Appl. No.: 761,089
[22] Filed: Jan. 21, 1977
[51] Int. Cl.[2] ........ A47J 49/02
[52] U.S. Cl. ........ 144/193 R; 74/222; 83/617; 144/3 K; 198/747; 254/184; 254/185 R
[58] Field of Search ........ 144/3 K, 193 R, 193 A; 254/184, 183, 185 R; 74/471, 224, 222; 83/435.1, 617, 707, 731; 198/747, 748

[56] References Cited

U.S. PATENT DOCUMENTS

| | | | |
|---|---|---|---|
| 351,202 | 10/1886 | Pelton | 83/435.1 X |
| 361,068 | 4/1887 | Lemm | 83/707 |
| 1,310,660 | 7/1919 | Inman | 144/193 R |
| 1,633,920 | 6/1927 | Bradford | 83/731 |
| 2,305,170 | 12/1942 | Jackson | 83/435.1 X |
| 2,446,585 | 8/1948 | Hanners | 144/193 R |
| 2,543,278 | 2/1951 | Davis | 83/707 |
| 2,778,392 | 1/1957 | Peterson | 83/435.1 X |
| 3,913,439 | 10/1975 | Large | 83/435.1 |

*Primary Examiner*—J. M. Meister
*Assistant Examiner*—W. D. Bray
*Attorney, Agent, or Firm*—O'Rourke and Harris

[57] ABSTRACT

A method and apparatus for splitting logs, comprising an engine or prime mover actuating a reciprocating trolley through mechanical linkages along a fixed bed such that the trolley may urge a log to be split against a blade or wedge with mechanically amplified force sufficient to accomplish the splitting but may be instantly reversed and withdrawn to starting position at a rate of speed substantially higher than the speed of the splitting stroke as a result of differing mechanical advantages of the forward and reverse mechanical linkages.

14 Claims, 5 Drawing Figures

WOODSPLITTER

BACKGROUND OF THE INVENTION

1. Field of the Invention

The present invention relates generally to methods and apparatus for splitting wood, and more particularly to method and apparatus for alternately mechanically powering a movable trolley to force a splitting wedge into a section of log with great mechanical advantage and retracting said trolley quickly with a differing substantially less mechanical advantage in preparation for reloading and recycling.

2. Description of the Prior Art

The need for power assisted log splitting equipment has long been realized, and the configuration which urges a log against a wedge has been established as the design most consistent with ease of loading and unloading operations. Numerous suggestions have been made as to how best to apply force to a wedge shaped blade so as to cause the blade to penetrate the end grain of sawn logs and cause the logs to split.

U.S. Letters Pat. Nos. 3,077,214 and 3,242,955 disclose means by which a splitting wedge or blade may be forced into a horizontally positioned log by hydraulic pressure generated by a pump and applied through a piston and cylinder arrangement. Although these designs provide both the power and control necessary to split logs, inclusion of a hydraulic system in the designs make the devices somewhat complex and relatively expensive to manufacture in that somewhat larger power sources are required because of hydraulic losses.

Several mechanically actuated non-hydraulic wood splitting machines have been proposed. U.S. Letters Pat. No. 946,705, for instance, discloses means by which a pitman is driven in reciprocating motion by rotating gears and alternately supplies splitting and retracting motion to a blade. In this machine, length of the splitting stroke and total cycle time are, of course, predetermined by the speed of rotation of the gear wheels and the manner in which the pitman is attached, so that the mechanism lacks a measure of flexibility in operation. U.S. Letters Pat. No. 1,189,999 discloses a device employing a worm and screw arrangement to supply driving force to a blade or wedge. The machine includes means by which the blade may be retracted from the work at a speed higher than that employed during the splitting stroke, thus reducing the total cycling time of the apparatus.

Devices depending on drum wound cable systems to supply longitudinal movement to blades or wedges have also been described. U.S. Letters Pat. No. 2,446,585 discloses an arrangement in which a movable table carrying a splitting head is actuated in either direction by a single strand of cable wrapped about a rotating drum, but the apparatus includes neither force multiplying sheaves nor means by which the return stroke may occur at a higher speed than the splitting stroke. U.S. Letters Pat. No. 1,310,660 describes a machine incorporating variable mechanical advantage in the splitting and return strokes but the concept is otherwise quite different from the present invention.

SUMMARY OF THE INVENTION

The present invention, which provides a heretofore unavailable improvement over previous log splitting machines, comprises a method and apparatus for exercising positive and instantaneous control over a horizontally reciprocating trolley throughout a cycle of operation consisting of a mechanically force-multiplied, variable length splitting stroke followed by a return stroke of substantially higher speed. The ratio between the rates of the splitting stroke and return stroke is established and controlled by a power transmission system comprised of a series of pulleys, belts, sheaves, and drum wound cables. Rotary power from an engine may be selectively applied as either slow longitudinal motion generating sufficient force to effect the splitting of logs, or substantially faster motion in the opposite direction for the purpose of promptly recycling the apparatus to a desired position.

Accordingly, an object of the present invention is to provide a new and improved apparatus for the splitting of wood or sawn logs, having as major features simplicity of design, portability, low cost, ease of operation, and high efficiency resulting from fast cycle speed.

Another object of the present invention is to provide a new and improved method of applying rotary power from an engine or prime mover to a reciprocating trolley such that sufficient force is generated between the trolley and a firmly fixed abutment to force a splitting blade attached to the trolley or the abutment into an interposed section of wood and cause the wood to split.

Yet another object of the present invention is to provide a new and improved method of utilizing power from an engine to retract a linearily reciprocating trolley at rate in excess of the rate at which the trolley performs the splitting stroke, thereby appreciably shortening the cycling time of the apparatus without affecting the force of the splitting stroke.

An additional object of the present invention is to provide a new and improved method for instantly reversing the horizontal motion of the trolley during the splitting stroke such that the apparatus may be returned to rest position and readied for a new cycle as quickly as possible following the successful splitting of a particular piece of wood.

These and other objects and features of the present invention will become apparent from the following description.

DETAILED DESCRIPTION OF THE INVENTION

Figure 1:
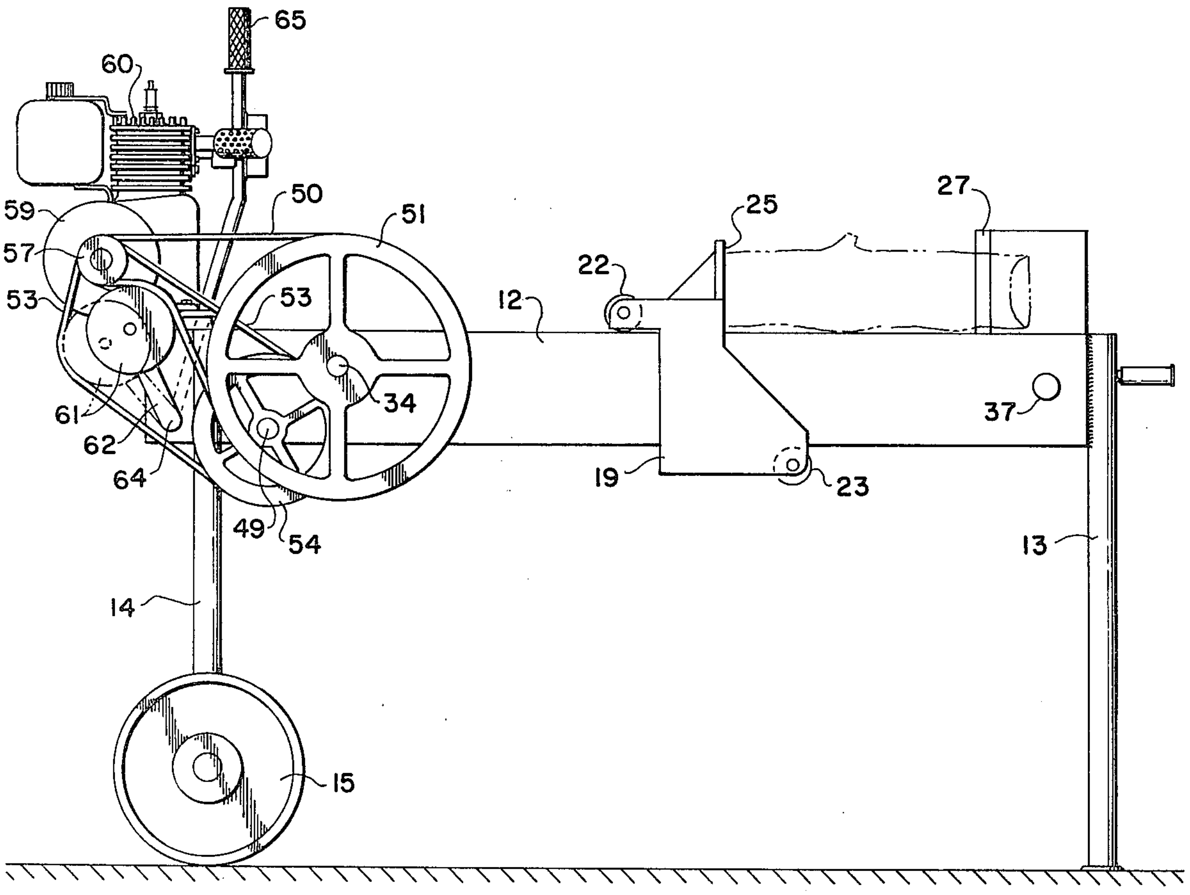
FIG. 1 is a frontal plan view of an apparatus in accordance with the instant invention with a log shown in ghosted fashion.
Figure 3:
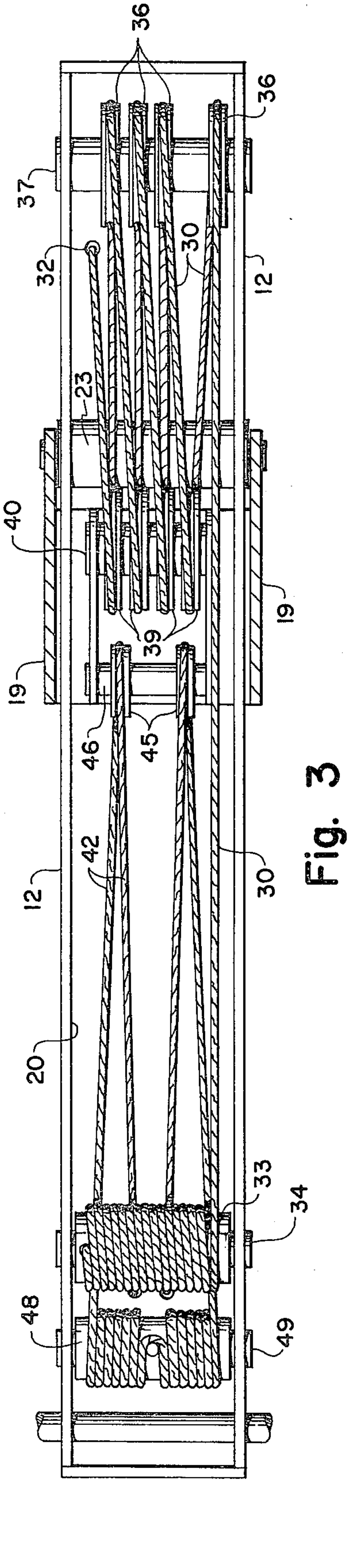
FIG. 3 is a more detailed top sectional view of the bed portion of the apparatus shown in FIGS. 1 and 2.
Figure 4:
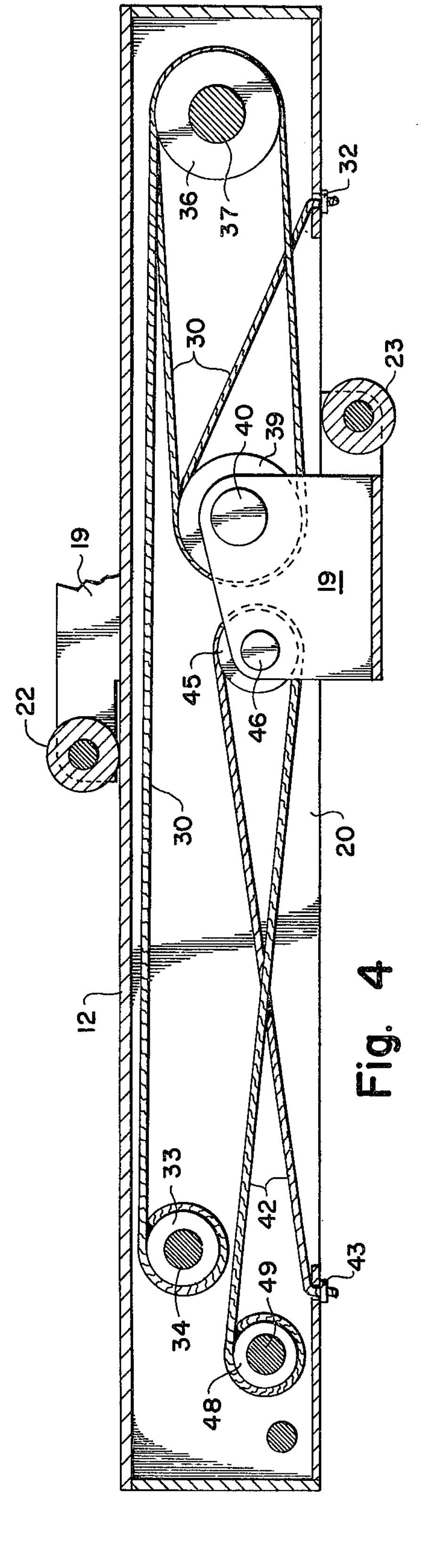
FIG. 4 is a side sectional view of the portion of the apparatus illustrated in FIG. 3.

Turning now to the drawings, wherein like components are designated by like numerals throughout the various figures, an apparatus for splitting wood is illustrated in FIG. 1 and generally designated by numeral 10. Apparatus 10 includes a main horizontal bed 12 supported at a convenient height by front leg 13 and rear legs 14 and afforded mobility by wheels 15. In the preferred embodiment as shown in FIGS. 3 and 4, bed 12 is a hollow square section tube with an opening 20 running parallel to the length of the bed on the underside. Bed 12 serves as a support and track for guidance of trolley 19 which, in cross section, also defines an open-ended box shape with internal dimensions roughly equal to the external dimensions of bed 12. Trolley 19, slideably mounted on bed 12 and free to move longitudinally thereon, is held in horizontal alignment by roller 22 which is journalled in trolley 19 such that it may contact and roll upon the upper surface of bed 12, and roller 23 is similarly journalled and positioned so as to contact the underside of bed 12. The upper portion of trolley 19 carries an abutment 25, oriented substantially perpendicular to the longitudinal axis of apparatus 10 and extending some distance above bed 12 for the purpose of engaging wood to be split.

In the preferred embodiment represented in these figures, blade 27 is shown to be firmly fixed to bed 12 in an upright position and in direct opposition to abutment 25, such that a log (shown in ghosted fashion) interposed between abutment 25 and blade 27 is caused, by motion of trolley 19 toward blade 27, to be pressed against blade 27 with great force and thereby to split apart. It should be realized that the apparatus would function essentially the same were blade 27 fixed in an upright position to trolley 19 and the wood to be split held horizontally immovable by an abutment attached to bed 12 in place of blade 27. Forceable decrease of the horizontal distance between trolley 19 and the end of bed 12 performs the work involved in splitting, and position of the blade is not a determining factor in the operation of the apparatus.

Cable 30, which is preferably metallic but may be rope, etc., applies force for splitting by drawing trolley 19 toward blade 27, as illustrated in FIG. 3. One end of cable 30 is secured to the bottom of bed 12 at attachment point 32 while the opposite end is fixed to drum 33 which is, in turn journalled inside bed 12 on shaft 34. Cable 30 passes around two sets of multiple sheaves, sheave set 36 being journalled at the blade end of bed 12 on shaft 37 and sheave set 39 journalled in trolley 19 on shaft 40. Movement of trolley 19 is thus effected by the winding of cable 30 around drum 33, thereby decreasing the total length of cable between sheave set 36 and sheave set 39. The plurality of sheaves in the sheave sets serves to mechanically amplify the force applied at trolley 19 by a factor directly proportional to the number of sheaves, insuring that rotary motion supplied to drum 33 through shaft 34 is converted to linear motion of trolley 19 of sufficient force to cause splitting of logs placed between abutment 25 and blade 27.

Cable 42 is secured to the bottom of bed 12 at attachment 43 and, in the preferred embodiment, runs over pulleys 45 firmly fixed to shaft 46, which is journalled in trolley 19, and then to drum 48 where it is fastened. Cable 42 is the means by which trolley 19 is retracted to starting position following the splitting stroke. Rotary motion of drum 48 on shaft 49 causes cable 42 to wind upon the drum and thereby draw trolley 19 in a direction counter to the splitting stroke. Cable 42 acts directly upon trolley 19, thereby conveying motion in essentially the same ratio of rate to force as in initially applied to drum 48 and allowing trolley 19 to be withdrawn at a velocity substantially above the velocity at which it is drawn toward blade 27 by cable 30 and multiple sheaves 36 and 39.

Figure 2:
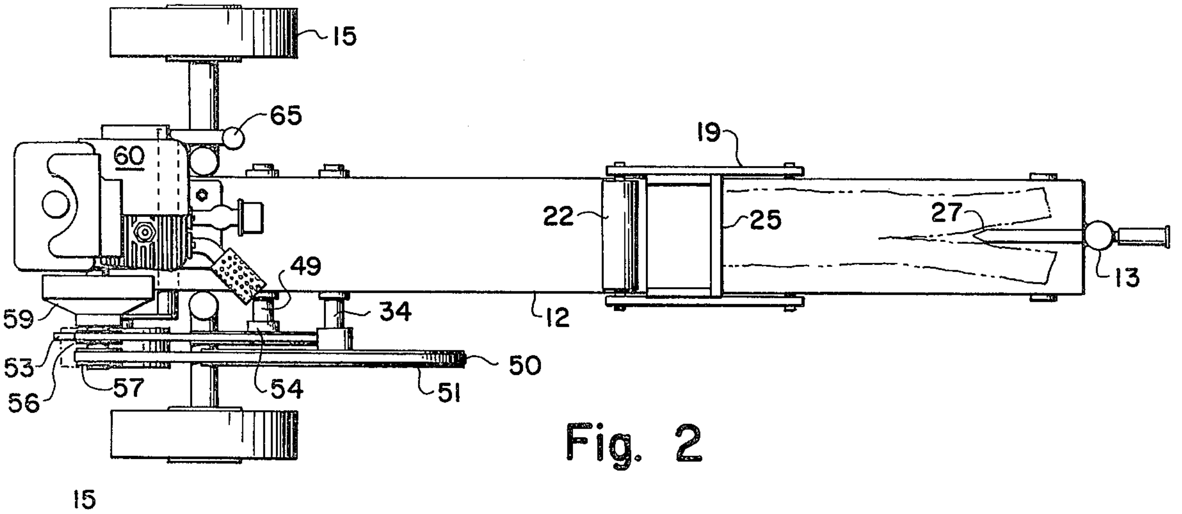
FIG. 2 is a top plan view of the apparatus shown in FIG. 1.

Drum 33, around which is wound cable 30 for the purpose of drawing trolley 19 toward blade 27, is driven rotationally by action of belt 50 on pulley 51, as shown in FIG. 2. Pulley 51 is firmly fixed to shaft 34 which in turn is fixed to drum 33 such that rotational force applied to pulley 51 by movement of belt 50 is transmitted undiminished to drum 33 causing cable 30 to wind upon it.

A similar arrangement supplies rotational movement to drum 48 which, in conjunction with cable 42 and pulleys 45, effects the withdrawal and return to starting position of trolley 19. Belt 53 imparts rotary force on pulley 54 which is connected, through shaft 49, to drum 48.

Belt 50 and belt 54 carry power from, respectively, pulleys 56 and 57 which form a double pulley fixed to shaft 58, the output shaft of speed reducer 59 connected to engine or prime mover 60. In the preferred embodiment, pulley 56 and pulley 57 are of a relatively small diameter; while pulley 51, connected to drum 33 and supplying splitting motion to trolley 19, is of a larger diameter than pulley 54 which is connected to drum 48 and provides retraction motion for trolley 19. This arrangement serves to further increase the mechanical enhancement of the splitting stroke force while establishing a relatively faster return rate for trolley 19.

Idler wheel 61, is journalled to control arm 62 which is, in turn, pivoted on bed 12, alternately tightens belt 50 and belt 53 insuring mutually exclusive actuation of pulley 51 and pulley 54. When either pulley is supplied power through its respective belt, the other pulley and attached drum is left free to rotate. Thus, as power is applied to pulley 51 through belt 50 for the purpose of winding cable 30 on drum 33 and thus to draw trolley 19 toward blade 27, drum 48 and pulley 54 are subjected to only a dampening drag but are substantially detached from engine 60. This allows cable 42 to freely unwind from drum 33 in response to travel of trolley 19. In the retraction mode, with belt 53 tightened by idler wheel 61 and drum 48 winding up return cable 42, the converse is true: cable 30 is able to unwind from freely revolving drum 33 at a rate in keeping with movement of trolley 19. Control arm 62 is pivoted on bed 12 such that movement of handle 65 shifts idler wheel 61 back and forth along an arc so that at one extreme pressure is applied to belt 50 and at the other extreme pressure is applied to belt 53. Changing the position of handle 65 therefore immediately and positively reverses the direction of travel of trolley 19 by supplying rotational motion to either pulley 51 or to pulley 54. The reversal of direction is independent of the position of trolley 19 on bed 12 so that the length of each splitting stroke is variable within the limits of travel of the trolley.

Figure 5:
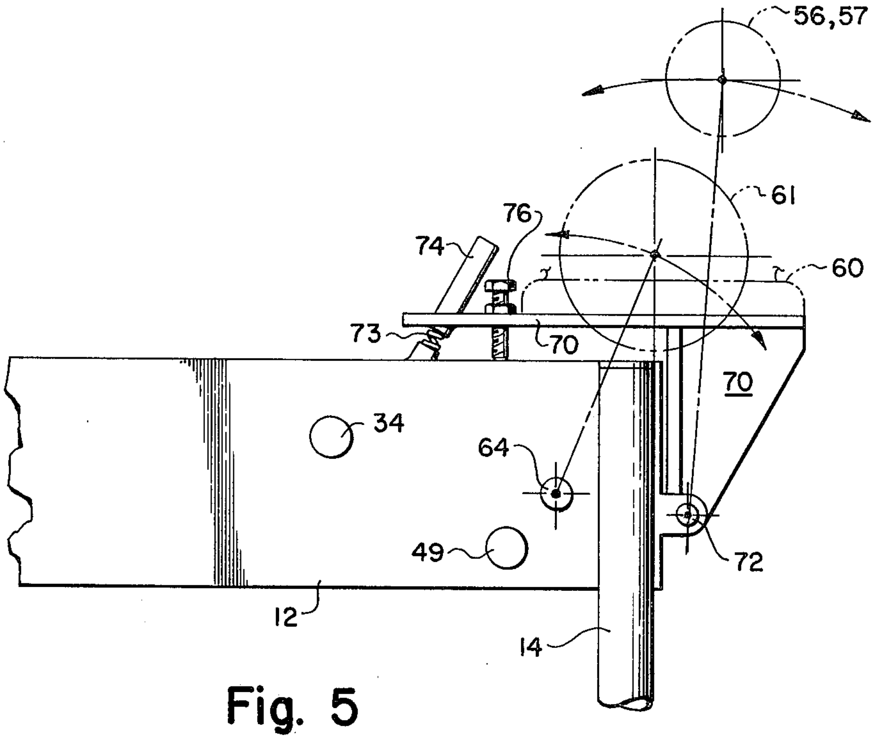
FIG. 5 is a detailed, partially schematic, view of the motor mounting portion of the apparatus shown in FIGS. 1 and 2.

As shown in FIG. 5, motor mount plate 70 is mounted to bed 12 at pivot 72. Spring 73 positioned in retainer 74 attached to motor mount plate 70 tend to rotate plate 70 in a clockwise direction as illustrated in FIG. 5, until movement is arrested by, for instance, belts 50 and 53 shown in FIG. 1. Adjustment screw 76 may then be positioned to provide a proper tension on belts 50 and 53 while limiting lash between plate 70 and bed 12 when torque from engine 60 is applied through pulley 57. Thus adjustment of motor position and tensioning of the belts 50 and 53 is a simple matter of pretensioning motor mount plate 70 against belts 50 and 53 and adjustment screw 76 to substantially zero lash.

As described above, cables, sheaths, pulleys, belts etc. have been found to be an efficient and compact mechanical drive system. High mechanical advantages may be readily obtained in the splitting mode. Because of the mechanical efficiency of such systems, a relatively low horse power prime power source is required. However, certain other mechanical drive systems, though being somewhat inferior to the above systems would be operable. For instance, a series of reducing gear drives engaging, for instance, a rack attached to the trolley would provide certain of the advantages of the preferred embodiment, though at the cost of greater complexity and expense.

Although only a preferred embodiment of the present invention has been illustrated and described, it is anticipated that various changes and modifications will be apparent to those skilled in the art, and that such changes may be made without departing from the scope of the claim of the invention as defined by the following claims.

What is claimed is:

1. A device for splitting wood comprising:
an elongated bed structure in the form of a boxed member enclosed on at least three sides;
a trolley movably mounted mounted on the bed structure;
an abutment;
a splitting blade, one of the abutment and the splitting blade being mounted on the trolley and the other being fixedly mounted relative to the bed;
a prime mover;
first mechanical drive means having a mechanical advantage greater than unity and sufficient to urge the splitting blade through wood with the power available from the prime mover, the first mechanical drive means being mounted between the trolley and the prime mover and connected to the trolley to move the abutment and splitting blade together;
a second mechanical drive means having a mechanical advantage less than that of the first mechanical drive means and also mounted between the prime mover and trolley but adapted to move the abutment and splitting blade apart;
the first and second mechanical drive means each comprising a cable member enclosed by the elongated bed and secured at one end to an associated driven drum within the elongated bed, each cable member engaging at least one intermediate pulley journalled to the trolley and also positioned within the elongated bed, and each cable being fixedly secured at the other end, the intermediate pulleys and driven drums being journalled around substantially parallel axes, and
selective engagement means operably connected to the prime mover and selectively engagable with either the first and the second mechanical drive means;
whereby the first mechanical drive means may be selectively engaged with the prime mover to move the trolley in a manner such that a log disposed on the bed will be split as the abutment and splitting blade move together and, upon splitting of the log, the abutment and slitting blade may be moved apart at a greater rate by selectively engaging the second mechanical drive means.

2. A device for splitting wood as set forth in claim 1 in which the trolley includes upper and lower rollers which movably engage the boxed member.

3. A device for splitting wood as set forth in claim 2 in which the first mechanical drive means includes a plurality of intermediate pulleys journalled to the trolley at a position between the upper and lower rollers and a plurality of pulleys fixedly journalled relative to the trolley with the cable member extending from the drive drum, back and forth between the pulleys journalled on the trolley and the fixedly journalled pulleys, and then to the secured end of the cable member.

4. A device for splitting wood as set forth in claim 1 in which:
the drive drums of the first and second mechanical drive means are connected to first and second driven pulleys, respectively, the driven pulleys being adjacent one another but axially offset,
a double pulley is carried on the prime mover, one of the double pulleys of the prime mover engaging a first drive belt connected to the first driven pulley of the first mechanical drive means and the other of the double pulleys of the prime mover engaging a second drive belt engaging the second driven pulley of the second mechanical drive means, and
the selective engaging means comprises an idler pulley carried on a support pivotally mounted around an axis offset from the rotational axis of the idler pulley, the idler pulley being in untensioned, non-driving contact with both the first and second drive belts but movable by rotation around the offset axis into engagement with either the first or second drive belts to produce drive tension in the selected belt thereby operatively connecting the prime mover through the selected drive belt to the selected mechanical drive motor.

5. A device for splitting wood as set forth in claim 4 in which a speed reducing means is interposed between the prime mover and the double pulley to reduce the speed and increase the torque of the double pulley.

6. A device for splitting wood as set forth in claim 4 which further includes an elongated handle attached to the idler pulley support and extending substantially transversely to the axis around which the idler pulley support is pivoted.

7. A device for splitting wood as set forth in claim 4 in which the prime mover is mounted to a plate which in turn is pivotally mounted around an axis spaced from but substantially parallel to the idler pulley support axis and the double pulley axis.

8. A device for splitting wood as set forth in claim 7 in which lash adjustment means are provided in the support plate to rotate the plate around the mounting axis and tension the first and second driven belts.

9. A device for splitting wood as set forth in claim 4 in which the first driven pulley is of a substantially larger diameter than the second driven pulley.

10. A device for splitting wood as set forth in claim 4 in which the prime mover is an internal combustion engine.

11. A device for splitting wood comprising: an elongated bed structure in the form of a hollow boxed member enclosed on at least three sides;
a trolley mounted on the exterior of the bed structure for movement longitudinally therealong;
an abutment;
a splitting blade, one of the abutment and the splitting blade being mounted on the trolley and the other being fixedly mounted to the bed;
a motor having a rotatable output shaft;
a double pulley secured to the motor output shaft for rotation;
first and second driven pulleys each attached to journalled shafts extending through the interior of the bed structure and carrying first and second drive drums, respectively;

first and second drive belts extending from the double pulley to the first and second driven pulleys, respectively, and in a nominally slack position;

an idler pulley positioned adjacent both the first and second drive pulleys and carried on a support mounted for rotation about an axis offset from the rotational axis of the idler pulley;

means for moving the idler pulley around the support axis in a first direction to selectively tension the first belt and in a second direction to selectively tension the second belt;

multiple pulleys positioned within the bed structure and journalled to the trolley;

complementary multiple pulleys fixedly journalled relative to the bed structure, positioned therein, and substantially aligned with the multiple pulleys journalled to the trolley;

first cable means disposed within the bed structure and wound at one end around the first drive drum connected to the first driven pulley, the cable means extending back and forth between the multiple pulleys on the trolley and the fixedly mounted multiple pulleys and anchored at the other end thereof, the first cable means being adapted to move the splitting blade and abutment together upon winding of the first cable means onto the first driven drum; and second cable means disposed within the bed structure and wound at one end around the second driven drum connected to the second driven pulley, the second cable means being operably connected to the trolley and adapted to move the splitting blade and abutment apart upon winding of the second cable means onto the second driven drum;

the mechanical advantage of the power train comprising the first driven belt, the first driven pulley and the associated driven drum with attached first cable means and multiple pulleys having a substantially greater mechanical advantage than the second power train comprising the second driven belt, the second cable means, whereby the blade and abutment may be driven together with great force or, alternatively, moved apart with substantially lesser force but at a greater rate.

12. A device for splitting wood as set forth in claim 11 in which the motor is an internal combustion motor.

13. A device for splitting wood as set forth in claim 11 in which the splitting blade is fixedly attached to the elongated bed structure and the abutment is secured to the trolley.

14. A device for splitting wood as set forth in claim 11 in which the motor is mounted to the device by means of a pivot axis substantially parallel to the output shaft and which further includes a lash adjustment means spaced from the pivot axis, whereby, the motor may be positioned around the pivot axis by the lash adjustment means to adjust the relationship of the double pulley carried on the motor to the first and second driven belts.

* * * * *